US009988002B2

(12) United States Patent
Carremm et al.

(10) Patent No.: US 9,988,002 B2
(45) Date of Patent: Jun. 5, 2018

(54) INTEGRATED BRACKET

(71) Applicant: Ford Global Technologies, LLC, Dearborn, MI (US)

(72) Inventors: Swadad A. Carremm, Canton, MI (US); Mahmoud Yousef Ghannam, Canton, MI (US); Sukhdev Badwal, Canton, MI (US); James W. Anderson, III, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/340,899

(22) Filed: Nov. 1, 2016

(65) Prior Publication Data

US 2018/0118136 A1     May 3, 2018

(51) Int. Cl.
*F16M 11/00* (2006.01)
*B60R 16/02* (2006.01)
*F16L 3/12* (2006.01)
*F16L 3/123* (2006.01)

(52) U.S. Cl.
CPC ........ *B60R 16/0215* (2013.01); *F16L 3/1226* (2013.01); *F16L 3/1233* (2013.01)

(58) Field of Classification Search
CPC ................................ F16M 11/00; B60N 21/00
See application file for complete search history.

(56) References Cited

U.S. PATENT DOCUMENTS

| 5,168,842 | A | * | 12/1992 | Brooks | ................... | F02F 7/006 |
| | | | | | | 123/143 C |
| 6,584,949 | B1 | | 7/2003 | Franchi et al. | | |
| 7,243,883 | B2 | * | 7/2007 | Judd | ................... | B60R 16/0215 |
| | | | | | | 248/74.1 |
| 2008/0026601 | A1 | | 1/2008 | Thai | | |
| 2008/0251652 | A1 | * | 10/2008 | Hollender | ................ | H02G 3/30 |
| | | | | | | 248/65 |
| 2009/0173844 | A1 | | 7/2009 | Huo | | |
| 2016/0066473 | A1 | | 3/2016 | Tsuboi et al. | | |

FOREIGN PATENT DOCUMENTS

| CN | 202024052 U | 11/2011 |
| CN | 204586730 U | 8/2015 |

* cited by examiner

*Primary Examiner* — Amy J. Sterling
(74) *Attorney, Agent, or Firm* — Julia Voutyras; McCoy Russell LLP

(57) ABSTRACT

Methods and systems are provided for an integrated bracket for securely retaining one or more cables of a harness to a vehicle body. In one example design, the integrated bracket may include a first plate with an opening to receive a fastener to securely attach the bracket to the vehicle body; an inlet gate coupled to the first plate; a second plate coupled and angled to the first plate; a protection shield extending from the first plate; and an exit gate attached to the second plate, each gate having an extending arm pair. In one example, by routing the cables of the harness through the bracket, and securely retaining the cables using clamps on the inlet and outlet gates, the bracket provides a simplified system for securely attaching the harness to the engine, thereby minimizing unnecessary cable movement, while reducing stresses exerted on the harness.

10 Claims, 7 Drawing Sheets

US 9,988,002 B2

INTEGRATED BRACKET

FIELD

The present description relates generally to components and/or systems of an integrated bracket mounted to a vehicle body.

BACKGROUND/SUMMARY

A vehicle may have harnesses of wires or lines. The wires may connect sensors and/or actuators to a control module, such as an engine controller. The lines may include flexible lines such as fuel and hydraulic lines to convey fluids from the engine to various parts of the vehicle. A sensor harness may include a plurality of cables, each cable having a different length or diameter. Because of the complexity of the sensor harness, a cable fixing structure such as a bracket may be used to securely attach the harness to a vehicle body. The bracket may be used in conjunction with other fixing accessories to secure the harness to the vehicle body.

An example wire harness fixing structure or bracket is disclosed by Tsuboi in US 20160066473 A1. Therein, the fixing structure comprises a retaining portion to clamp a wire harness, a flat plate with a first and second opening, and a vertical portion connecting the retaining portion to the flat plate. The bracket may be mounted to an engine using a fastener, such as a bolt that may be extended through the first opening in the flat plate, and fastened to a top portion of an engine.

However, the inventors have recognized potential issues with the above wire harness fixing structure. For example, the retainer of the fixing structure may be configured to secure a single cable instead of a plurality of cables, rendering the structure unsuitable for a complex harness comprised of multiple cables. Furthermore, the single retainer provided on the fixing structure may not adequately secure a harness with long cables, causing the harness to waggle and posing potential for damage and disruption of data transmission.

The inventors herein have developed an integrated bracket to address some of issues noted above. In one example, an integrated bracket comprises a first plate with an opening to receive a fastener to securely attach the bracket to a vehicle body; an inlet gate coupled to the first plate; a second plate coupled and angled to the first plate; a protection shield extending from the first plate; and an exit gate attached to the second plate, each gate having an extending arm pair.

In this way, one design of the integrated bracket may be used to secure a plurality of cables of a sensor harness in between extending arms of inlet and exit gates, each cable optionally having a different length or diameter. The protection shield on the bracket may provide a way of guiding the cables and protecting the sensor harness from environmental elements. The example approaches described here may confer several advantages. For example, an integrated bracket may be designed to resist mechanical and environmental stresses, and may be used with different vehicle designs. Also, the bracket may be comprised of durable materials, allowing the bracket to operate under a wide range of conditions. In this way, the integrated bracket provides a simplified harness fixing structure with minimal maintenance and improved performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure

BRIEF DESCRIPTION OF THE DRAWINGS

FIGS. 1-5 are shown to scale, although other relative dimensions may be used, if desired.

DETAILED DESCRIPTION

Figure 1:
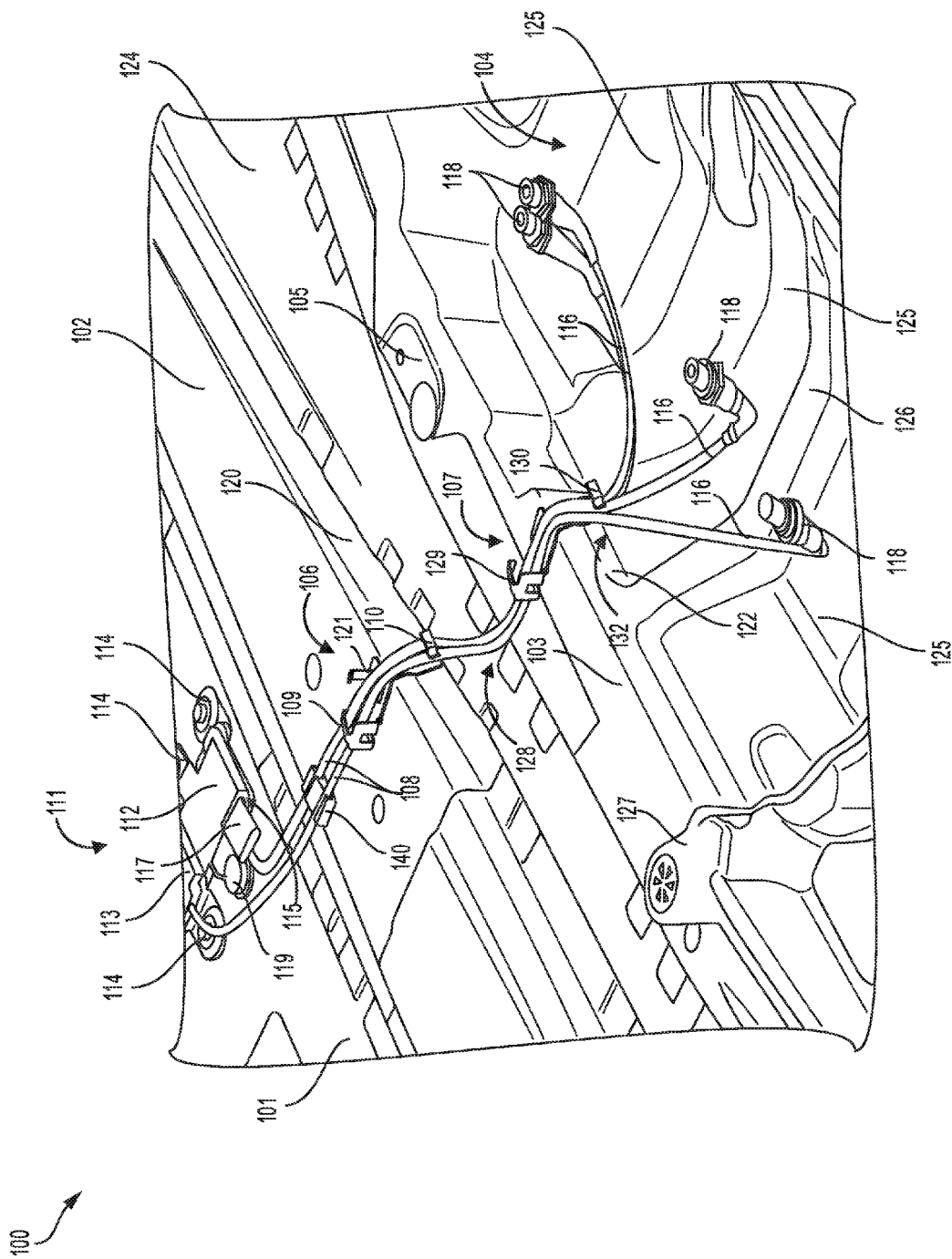
FIG. 1 shows a schematic depiction of an example vehicle engine with brackets to securely retain cables of a sensor harness.

The present description relates generally to systems of an integrated bracket mounted to a vehicle body. Specifically, the integrated bracket may be configured with an inlet and outlet gate acting in conjunction with a protection shield to securely retain one or more cables of the harness to a surface of an engine as shown in FIG. 1. A first embodiment of the integrated bracket depicted in FIGS. 2A-2C, may be configured with the protection shield to direct and retain one or more cables of the sensor harness. A second embodiment of the integrated bracket may be configured with no protection shield, as shown in FIG. 3. The integrated bracket may be used to securely retain a plurality of cables as disclosed in FIGS. 4-5, and as shown in FIG. 1. In each of the first and second embodiment of the integrated bracket, the cables comprising the sensor harness, may be secured within the inlet gate at an upstream end of the bracket, and within the outlet gate, at a downstream end of the bracket. When secured to the bracket, the cables may be in face-sharing contact with planar surfaces forming part of the bracket, for example. The bracket in each of the first and second embodiments, may be securely attached to a portion of the engine, to minimize unnecessary movement of the cables. The integrated bracket may be designed to resist mechanical and environmental stresses, and may be used with different vehicle designs. In this way, the integrated bracket provides a simplified system for securing cables of the sensor harness with minimal maintenance and improved performance.

FIGS. 1-5 show example configurations with relative positioning of the various components of the integrated bracket. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning to FIG. 1, a schematic view 100 is shown of a harness coupled to engine sensors and securely attached to an engine using a first bracket 106 and a second bracket 107. The harness may comprise a plurality of primary cables 108 and secondary cables 116 coupled to an engine module 111, and connected to sensor units 118. The engine module 111 may include a first data module 112 and a second data module 113, each module securely mounted to an upstream portion 101 of the engine.

The first bracket 106 may be securely attached to the engine at a middle planar surface 102 of the engine, with an adjacent side wall 120 formed downstream of the middle planar surface 102. As an example, the first bracket may be attached to middle planar surface 102 of the engine using a first bolt or other suitable means of mechanical assembly. A second bracket 107 may be attached to a downstream surface 103 having an adjacent a side wall 122. For example, the second bracket may be attached to the downstream surface 103 using a second bolt or other suitable fastener. In this example, the first bracket 106 is mounted upstream of the second bracket 107. In alternative embodiments, the second bracket 107 may be mounted to the engine at an upstream location from the first bracket 106. As an example, the first bracket 106 and the second bracket 107, may be comprised of a durable material such as cast iron, stainless steel and other appropriate metals or alloys. An intermediate surface 124 may be formed between the middle surface 102 and the downstream surface 103. The side wall 122 transitions into a lower portion 104 of the engine having a plurality of recessed compartments 125, which are separated by rib sections 126. The middle, intermediate and downstream surfaces, including the upstream portion 101 and lower portion 104 may comprise a section of the engine containing a radiator 105, fan mechanism 127, engine sensors, etc.

The first data module 112 and the second data module 113 may be mounted to the upstream portion 101 of the engine using a plurality of fasteners 114. The first data module 112 attached to a connector 119, may include a port 115 to receive a data bus 117 connected to the primary cables 108, which are routed to the first bracket 106 via a splice connector 140 mounted to the first planar surface 102. The second data module 113 may be directly connected to the primary cables 108 and routed to the first bracket 106. As an example, the primary cables 108 may be routed through an inlet gate 109 of the first bracket 106, and directed by a protection shield 121 on the bracket to an outlet gate 110, where the primary cables 108 are subsequently extended to a first junction 128. Subsequently, the primary cables 108 may be routed through an inlet gate 129 of the second bracket 107, and extended to an outlet gate 130, where the primary cables 108 are subsequently extended to a second junction 132, where the primary cables 108 split into secondary cables 116. In one example, the primary cables 108 and secondary cables 116 comprise a harness system for transmitting data between engine module 111 and sensor units 118, which may include an engine NOx sensor, CO sensor etc. In another example, the inlet 109 and outlet gate 110 on the first bracket 106 may comprise a plurality of clamps to securely hold down the primary cables 108 to the first bracket 106. Similarly, the inlet gate 129 and outlet gate 130 on the second bracket 107, may comprise a plurality of clamps to securely hold down the primary cables 108 and secondary cables 116 to the second bracket 107.

The first and second data modules may communicate with sensor units 118 via the primary cables 108 and secondary cables 116. As an example, sensor signals may be transmitted along one or more primary cables 108 and secondary cables 116 to the engine module 111, where the signals may be further transmitted to an engine controller (not shown) to control engine operation.

In this way, the communication cables and other flexibles line comprising a harness may be secured to the engine using a plurality of first bracket 106 and second bracket 107. By routing the communication cables or flexible lines through the brackets, and securely clamping the cables or lines together using a plurality of clamps on the inlet and outlet gates on the brackets, the harness may be securely attached to the engine to reduce movement of the harness while minimizing mechanical and environmental stresses exerted on the cables or lines.

Figure 2A:
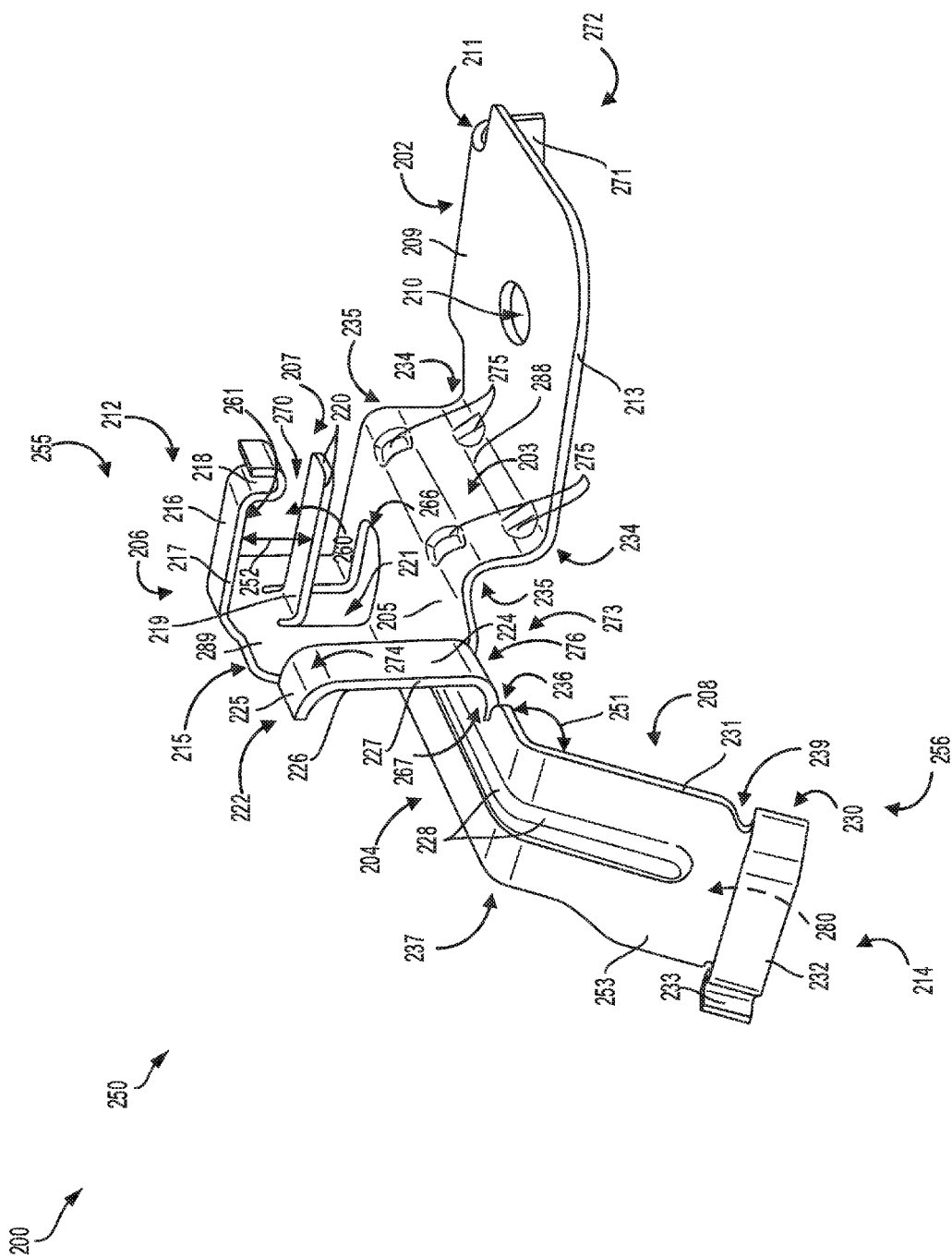
FIG. 2A shows a first view of a first embodiment of the bracket for securing cables of the sensor harness.
Figure 2B:
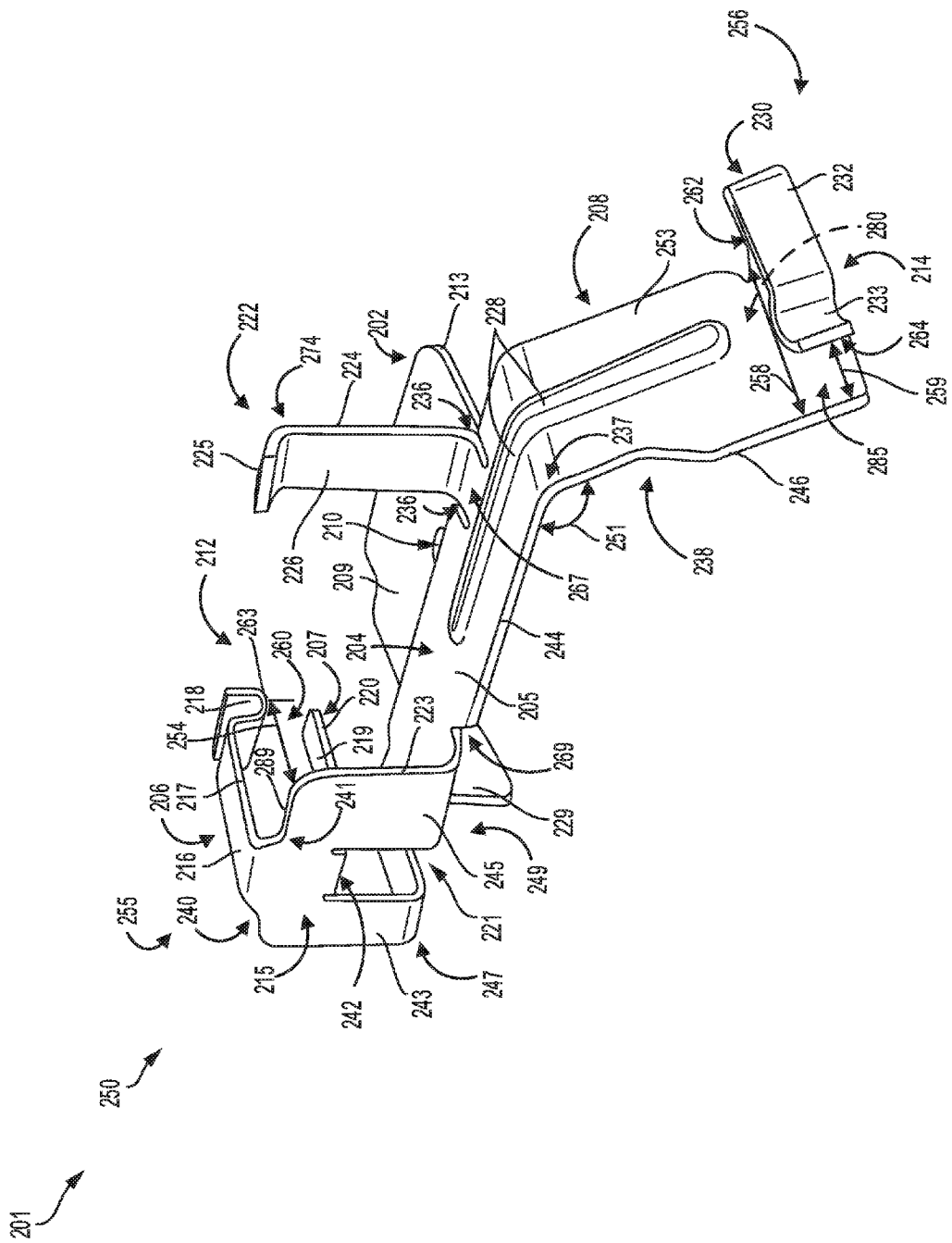
FIG. 2B shows a second view of the first embodiment of the bracket for securing cables of the sensor harness.
Figure 3:
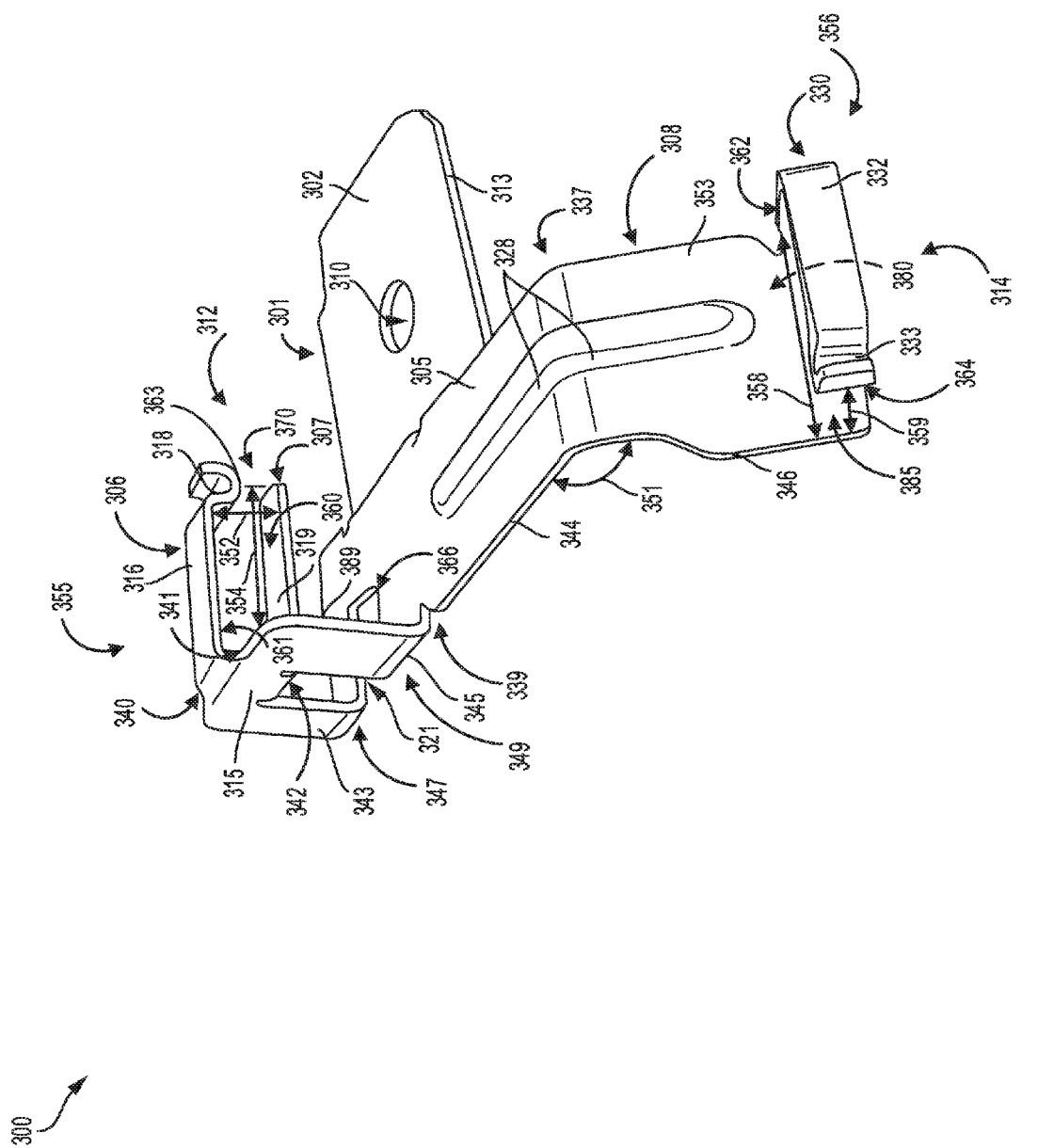
FIG. 3 shows a schematic view of a second embodiment of the bracket for securing cables of the sensor harness.

Turning to FIGS. 2A-2B, a first view 200 and a second view 201 of a first embodiment of an integrated bracket 250 are depicted. The integrated bracket 250 comprises a base plate 202 connected to a first plate 204 and an angled plate 208. The angled plate 208 may form a second plate that is angled to the first plate 204. Specifically, the base plate 202 connects to the first plate 204 via a transition plate 203 having a first junction 234, a second junction 235 and plurality of recessed slots 275. The first plate 204 has a flat portion 205 that connects to an upstream plate 215 having an inlet gate 212 and an aperture 221. The angled plate 208 includes an outer surface 253, a side edge 246, and an outlet gate 214 formed on a downstream end 256 of the integrated bracket 250. The aperture 221 formed on the upstream plate 215, is formed between a first section 243 and a second section 245 of the upstream plate 215; the aperture 221 extending to a side section 266 of the flat portion 205.

As shown in FIGS. 2A-2B, the base plate 202 includes an outer surface 209, an edge surface 213, and a side curved portion 211 having a side surface 271. As an example, the base plate 202 may be formed parallel to the first plate 204 but positioned below the first plate 204 and connected to the first plate 204 by a transition plate 203. An opening 210 formed through the outer surface 209 of the base plate 202, may be configured with a suitable diameter to receive a fastener, to secure the base plate 202 to an engine. As an example, a bolt may be inserted into the opening 210 to secure the base plate 202 to a portion of the engine, such as planar surfaces 102 and 103, shown in FIG. 1. The transition plate 203 connected to the base plate 202 at the first junction 234, may include recessed slots 275 formed on an outer surface 288 of the transition plate 203 to reduce weight of the bracket 250. The transition plate 203 transitions to the first plate 204 via the second junction 235, forming a continuous plate as disclosed further below with reference to FIG. 2C. As an example, each of the first and second junction on the transition plate 203 may be curved sections; the first junction 234 having a convex shape that merges into the base plate 202, while the second junction 235 may be a concavely shaped portion that merges into the first plate 204. In this way, the entire bracket 250 is made of a single, continuous, unitary, and monolithic metal plate structure as disclosed further in FIG. 2C.

Figure 2C:
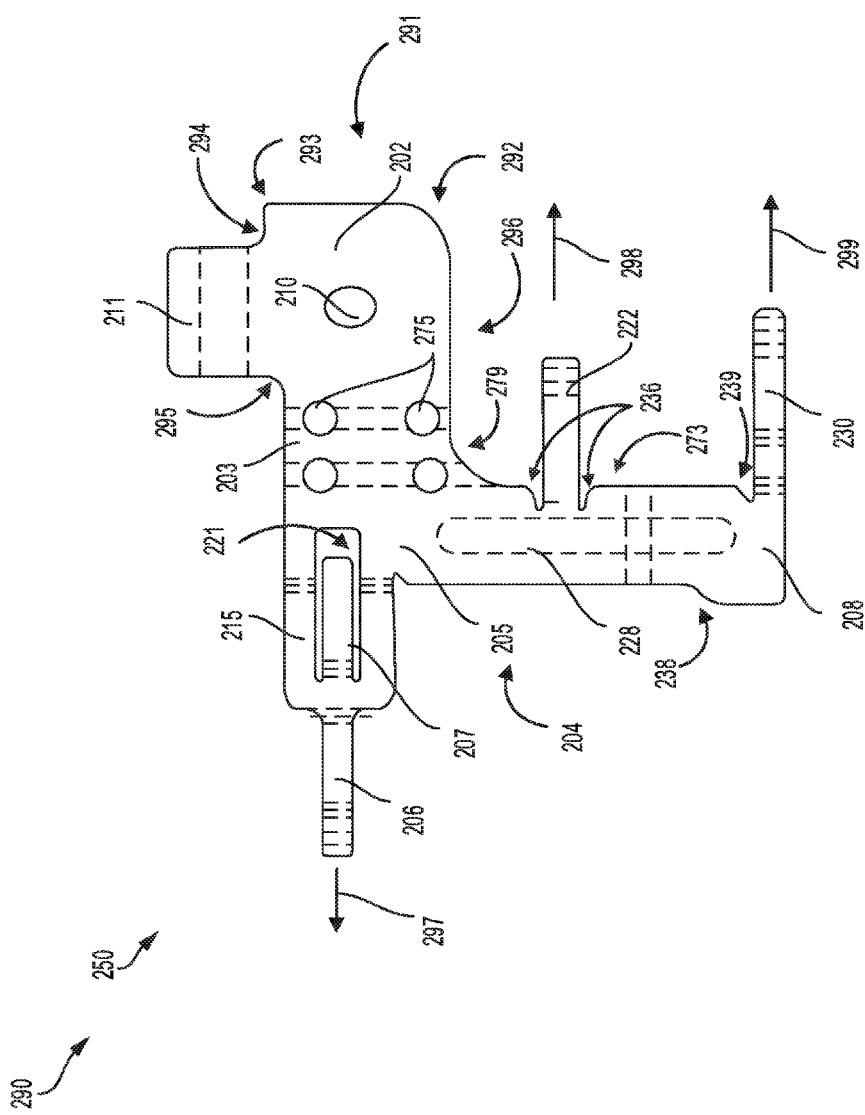
FIG. 2C shows an alternative view of the bracket, with different portions of the bracket unfolded.

Referring to FIG. 2C, an alternative view 290 depicting different portions of the integrated bracket 250 in an unfolded position is shown. The base plate 202 has a first side 291 with a first curved section 292 and a second curved section 293. As an example, the first and second curved sections 292 and 293 of the base plate 202, may be convexly shaped sections; the first curved section 292 having a larger radii of curvature compared to the second curved section 293. The base plate 202 connects to the side curved portion 211 at a first transition location 294 and a second transition location 295. As an example, each of the first and second transition locations 294 and 295 may be concave shaped sections, which allow a smooth transition between the base plate 202 and side curved portion 211. Further, the base plate 202 connects to the transition plate 203 having the recessed slots 275. A first side 296 of the transitions plate 203 includes a curved section 279 which connects to the flat portion 205 of the flat plate 204. As an example, the curved section 279 may be a concavely shaped section which transitions smoothly between the transition plate 203 and the flat plate 204.

The upstream plate 215 connected to the flat plate 204, is shown with the plate stretched out, as shown by an arrow 297. Similarly, a first retaining arm 206 formed on the upstream plate 215, is depicted in a stretched out position, as shown by the arrow 297. A second retaining arm 207, may be formed by cutting out a section of the upstream plate 215 and a portion of the flat plate 204, creating the aperture 221. As an example, the second retaining arm 207 may be a horizontally extending arm positioned above the aperture 221. In other examples, the first retaining arm 206 may be adjusted to a form a C-shaped portion that retains cables of a sensor harness between the first and second retaining arms, as disclosed further below with reference to FIGS. 2A-2B.

A protection shield 222 connected to a side section 273 of the flat plate 204, is shown in a horizontal position, with the protection shield stretched out in a direction 298. As an example, the protection shield 222 may connect to the flat plate 204 at curved junctions 236; the protection shield 222 forming an integral portion of the flat plate 204. In another example, the protection shield 222 may be stretched vertically, forming a vertical guide arm that may be used to guide cables of the sensor harness as disclosed with reference to FIGS. 2A-2B. In other examples, the flat plate 204 and angled plate 208 may have a recessed slot 228 that does not form part of the protection shield 222. The protection shield 222 may be formed upstream of the angled plate 208, in further examples. The angled plate 208 may include a third retaining arm 230, depicted in a horizontal position, as shown in FIG. 2C. As an example, the third retaining arm 230 on the angled plate 208, may be a horizontally extending arm stretched out in a direction 299. In other examples, the third retaining arm 230, may be folded into a C-shaped section as disclosed in FIGS. 2A-2B, allowing the retaining arm 230 to secure one or more cables of the sensor harness to the angled plate 208. The angled plate 208 may include a first curved section 238, and a second curved section 239 adjacent to the third retaining arm 230.

In this way, the integrated bracket 250 is made of a continuous and monolithic metal plate comprising the base plate 202 which is connected to the side curved portion 211 and transition plate 203; the transition plate 203 is connected to the flat plate 204 having the flat portion 205 and angled plate 208.

Turning back to FIGS. 2A-2B, the flat portion 205 of the first plate 204 may connect to the first section 243 and second section 245 of the upstream plate 215 at a first position 247 and a second position 249, respectively. A web plate 229 is connected to a bottom portion of the second section 245, adjacent to a curved section 269, formed between a side portion 223 of the upstream plate 215 and a side edge 244 of the first plate 204. The upstream plate 215 may also connect to the first retaining arm 206 and second retaining arm 207. As an example the first retaining arm 206 may connect to the upstream plate 215, forming a first shoulder 240 and second shoulder 241. The first retaining arm 206 may comprise a planar surface 216, a curved portion 218 and a side section 217. The second retaining arm 207 may connect to the upstream plate 215 at an inner junction 242. As an example, a section of the upstream plate 215, may be cut to form the second retaining arm 207 and the aperture 221. For example, the aperture 221 in the first plate 204 is formed below the inlet gate 212, while the angled plate 208 has no aperture below the outlet gate 214. The second retaining arm 207 may comprise an outer surface 219 and a side section 220. The first and second retaining arms may form the inlet gate 212 to retain one or more cables of a harness connected to an engine module, such as cables 108 connected an engine module 111 shown in FIG. 1. As an example, the inlet gate 212 may be configured with a main opening 260 that allows one or more cables of the harness to be routed through the inlet gate 212. In another example, the inlet gate 212 may further include a side opening 270, for removing cables out of the main opening 260, such that the cables are no longer retained by the inlet gate.

The protection shield 222 connected to the side section 273 of the first plate 204, may comprise a vertical flat plate 224 to protect a bundle of the cables, and a curved top portion 225. As an example, the vertical flat plate 224 of the protection shield 222 may extend perpendicularly from a first plate 204; the protection shield 222 may further comprise a top curved exterior end 274 and a bottom curved exterior end 276, the bottom curved end 276 smoothly joining a top surface 267 of the first plate 204, the curved ends 274 and 276 and the vertical flat plate forming a C-shape. In one example, the base plate 202 may extend on a side 272 facing away and oppositely from the curved C-shaped ends of the protection shield 222. In another example, protection shield 222 may include an inner surface 226 and a side section 227. In other examples, the vertical protection shield 222 may be adjacent to the base plate 202, and may connect to the first plate 204, forming curved junctions 236 on either side of the vertical protection shield 222. In further examples, the vertical flat plate 224 and curved portion 225 of the vertical protection shield 222 may direct one or more cables routed from the inlet gate 212 to a downstream end 256 of the bracket 250.

The first plate 204 may also include a recessed section 228 formed along a middle section of the first plate 204; the recessed section 228 extending to a section of the angled plate 208 at a curved section 238. As an example, the first plate 204 and angled plate 208 may include the recessed section 228 extending along a middle continuously and uninterruptedly including at a junction 237 of the first plate 204 and angled plate 208. The first curved section 238 on the angled plate 208, has a first side edge 231, and the second curved section 239 has second side edge 244. As an example, the first curved section 238 may be convex in shape while the second curved section 239 may be concavely shaped. An outlet gate 214 formed at a downstream end 256 of the angled plate 208, may include a first opening 280 formed between the third retaining arm 230 and the outer surface 253 of the angled plate 208. The outlet gate 214, may further include a second opening 285, for removing cables out of the first opening 280, such that the cables are no longer retained by the outlet gate. As an example, the first opening 280 may be a main opening for routing the cables through the outlet gate 214, while the second opening 285 may be a side opening for removing cables from the outlet gate 214.

The third retaining arm 230 may include an outer surface 232 and a concavely curved portion 233. One or more cables routed from the inlet gate 212, may be extended downstream to the outlet gate 214, where the third retaining arm 230 may secure the cables to the outer surface 253 of the angled plate 208, for example. In this case, the cables may be retained in the opening formed between the third retaining arm 230 and the top surface 253 of the angled plate 208. Details of routing cables through the inlet and outlet gates of the bracket 250 are disclosed further below with reference to FIG. 4.

The inlet gate 212 at the upstream end 255 of the first plate 204, may have a height 252 and length 254. For example, the height 252 of the inlet gate 212 may extend from an inner surface 261 of the first retaining arm 206 to the outer surface 219 of the second retaining arm 207. In one example, the height 252 of the inlet gate 212 may have a first diameter larger than a diameter of one or more cables routed through the inlet gate 212. In another example, the length 254 of the inlet gate 212 may extend from an inner surface 289 of the upstream plate 215 to an inner portion 263 of the curved section 218 of the first retaining arm 206. In one example, the length 254 of the inlet gate 212 may be selected to accommodate one or more cables routed through the inlet gate 212. In other examples, the height 252 may be greater than 10 mm and the length 254 may be greater than 19 mm. In further examples, the height 252 and length 254 of the inlet gate 212 may be adjustable based on a diameter, weight and number of cables of the sensor harness.

The outlet gate 214 on the angled plate 208 may have a height 259 and length 258. For example, the height 259 of the outlet gate 214 may extend from an inner section 264 of the third retaining arm 230 to an outer surface 253 of the angled plate 208. In one example, the height 259 of the outlet gate 214 may have a first height greater than a diameter of one or more cables routed through the inlet gate 212. In another example, the length 258 of the outlet gate 214 may extend from an inner portion 262 of the outlet gate 214, to a side edge 246 of the angled plate 208. In one example, the length 258 of the outlet gate 214 may be selected to accommodate one or more cables routed through the outlet gate 214. In other examples, the height 259 may be greater than 10, mm and the length 258 may be at least 19 mm. In further examples, the height 259 and length 258 of the outlet gate 214 may be adjustable based on the diameter, weight and number of cables of the sensor harness.

In this way, the integrated bracket may comprise the base plate 202 secured to the engine, and the first plate 204 having the inlet gate 212, vertical protection shield 222 and outlet gate 214. By routing one or more cables of the harness through the inlet and outlet gates of the bracket, and the vertical protection shield 222 retaining the cables, the harness may be securely attached to the engine to reduce cable movement while minimizing stresses exerted on the harness.

Turning to FIG. 3, a schematic view of a second embodiment of an integrated bracket 300 is depicted. The integrated bracket may comprise a base plate 301 connected to a horizontal plate 304 having a flat portion 305, and an angled plate 308 formed at a junction 337 of the horizontal plate 304. The base plate 301 may connect to the horizontal plate 304 at first junction 335, forming a continuous plate. An upstream plate 315 formed on an upstream end 355 of the flat portion 305, may include an aperture 321 formed between a first section 343 and a second section 345, the first and second section forming a portion of the upstream plate 215. The aperture 321 extends to a side section 366 of the flat portion 305. In this way, the integrated bracket 300 is made of a single, continuous, unitary, and monolithic metal plate structure.

As shown in FIG. 3, the integrated bracket 300 has similar features as the bracket 250 in the first embodiment disclosed with reference to FIGS. 2A-2B, except for a few features. A detailed description of common features found on the integrated bracket 300 and the bracket 250 are disclosed above with reference to FIGS. 2A-2B. The distinguishing features of the integrated bracket 300 are disclosed herein. For example, the integrated bracket 300 may not have a vertical protection shield (e.g., vertical protection shield 222 shown in FIGS. 2A-2B) on a side wall 344, and a web plate (e.g., web plate 229 in FIG. 2B) formed underneath the second section 345 of the upstream plate 315. In one example, the horizontal plate 304 may be continuous with no notches (e.g., notches 236 in FIGS. 2A-2B) downstream of the horizontal plate 304. By reducing a number of notches on the horizontal plate 304, structural integrity of the integrated bracket 300 may be improved to resist stress exerted on the bracket during engine operation. The horizontal plate 304 may be folded at a junction 337 forming an angle 351 between the flat portion 305 and the angled plate 308. The angle 351 may be formed to fit slopes of surfaces on an engine, such as side walls 120 and 122 in FIG. 1, for example. In one example, the angle 351 may be selected to range from 90-170 degrees, although other angles may be possible. Details of adjusting angle 351 to fit slopes of surfaces of the engine are disclosed further below, with reference to FIG. 5.

An inlet gate 312, formed at an upstream end 355 of the flat portion 305, may be configured with a first opening 360 that allows one or more cables of the harness to be routed through the inlet gate 312. In another example, the inlet gate 312 may further include a side opening 370, for removing cables out of the first opening 360, such that the cables are no longer retained by the inlet gate. The inlet gate 312 may have a height 352 and length 354. As an example, the height 352 of the inlet gate 312 may extend from an inner surface 361 of a first retaining arm 306 to a top surface 319 of a second retaining arm 307. In one example, the height 352 of the inlet gate 312 may be selected to be larger than a diameter of one or more cables routed through the inlet gate 312. In another example, the length 354 of the inlet gate 312 may extend from an inner surface 389 of the upstream plate 315 to an inner portion 363 of the curved section 318 of the first retaining arm 306. In one example, the length 354 of the inlet gate 312 may be selected to accommodate one or more cables routed through the inlet gate 312. In other examples, the height 352 may be at least 15 mm and the length 354 may be greater than 20 mm. In further examples, the height 352 and length 354 of the inlet gate 312 may be adjustable based on a diameter, weight and number of cables of the sensor harness.

The angled plate 308 may include an outlet gate 314, formed at a downstream end 356 of the integrated bracket 300. The outlet gate 314 may include a first opening 380 formed between the third retaining arm 330 and the outer surface 353 of the angled plate 308, for example. The outlet gate 314, may further include a second opening 385, for removing cables out of the first opening 380, such that the cables are no longer retained by the outlet gate. In one example, the first opening 380 may be a main opening for routing the cables through the outlet gate 314, while the second opening 385 may be a side opening for removing cables from the outlet gate 314.

The outlet gate 314 may have a height 359 and length 358. For example, the height 359 of the outlet gate 314 may extend from an inner section 364 of a third retaining arm 330 to an outer surface 365 of the angled plate 308. In one example, the height 359 of the outlet gate 314 may have a larger height than a diameter of one or more cables routed through the inlet gate 312. In another example, the length 358 of the outlet gate 214 may extend from an inner portion 362 of the outlet gate 314, to a side edge 346 of the angled plate 308. In one example, the length 358 of the outlet gate 314 may be selected to accommodate one or more cables routed through the outlet gate 314. In other examples, the height 359 may be at least 15, mm and the length 358 may be at least 20 mm. In further examples, the height 359 and length 358 of the outlet gate 314 may be adjustable based on the diameter, weight and number of cables of the sensor harness.

In this way, the integrated bracket 300 may comprise the base plate 301 and the first plate 304 having the inlet gate 312 and the outlet gate 314. By routing one or more cables of the harness through the inlet and outlet gates of the bracket 300, the harness may be securely attached to the engine to reduce cable movement while minimizing stresses exerted on the cables.

Figure 4:
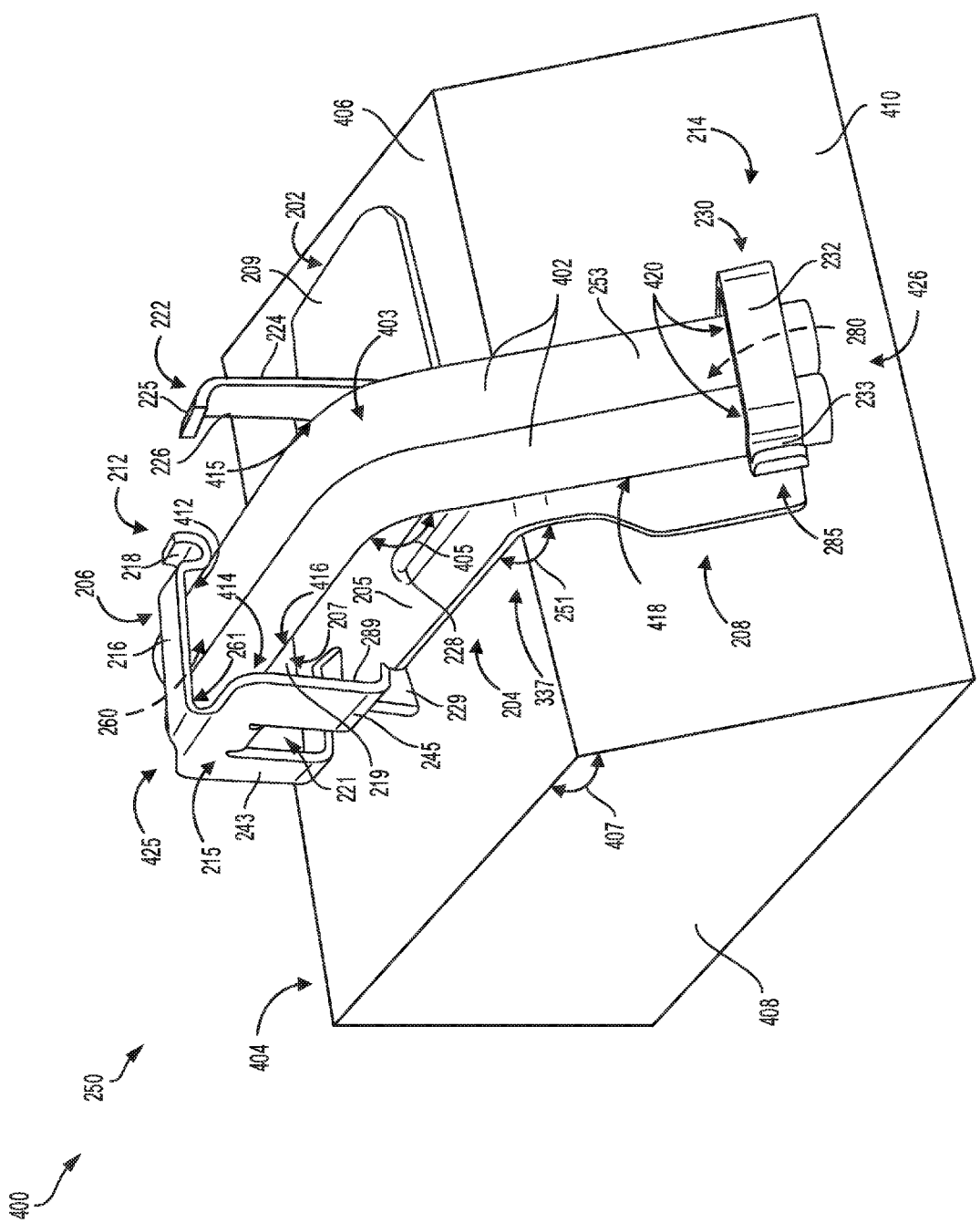
FIG. 4 shows a schematic view of the first embodiment of the bracket used to secure cables of the sensor harness to a section of the engine.

Turning to FIG. 4, a schematic view 400 of the first embodiment of the integrated bracket 250 mounted to an engine section 404 is depicted. Specifically, cables 402 comprising a harness are mounted to the integrated bracket 250 having a base plate 202 connected to a first plate 204 with a flat portion 205, a vertical protection shield 222, and an angled plate 208. The base plate 202 may be connected to a first surface 406 of the engine section 404 using a bolt inserted into an opening (e.g., opening 210 in FIGS. 2A-2B) in the base plate 202. The engine section 404 may also include a second surface 408 and a third surface 410. The first and third surfaces of the engine section 404 may be joined together forming an angle 407. The first surface 406 of the engine section 404 may form a first level of a vehicle body, and the third surface 410 may form a second level of the vehicle body. In this case, the first plate 204 may be mounted to the first level of the vehicle body, and the angled plate 208 may be mounted to the second level of the vehicle body.

As shown in FIG. 4, the cables 402 may be routed through an inlet gate 212 at an upstream end 425 of the integrated bracket 250. When mounted inside the inlet gate 212, the cables 402 may be in face-sharing contact with an inner surface 289 of the upstream plate 215, an inner surface 261 of a first retaining arm 206, and outer surface 219 of a second retaining arm 207. As an example, the cables 402 may touch the inner surface 289 of the upstream plate 215, forming a contact interface a long a first plane, as shown by arrow 414. In another example, the cables 402 may touch the inner surface 261 of the first retaining arm 206, and outer surface 219 of the second retaining arm 207, forming contact interfaces a long a second and third plane, as shown by arrows 412 and 416, respectively.

The cables 402 may be extended over the flat portion 205 and subsequently bent, forming a flex angle 405 at a cable junction 403. As an example, a curvature of the cables 402 at the cable junction 403 may be a convex shape with a direct relationship with the flex angle 405, and a direct or indirect relationship with a plate angle 251 of the first plate 204 and the angle 407 formed between the first surface 406 and third surface 410 of the engine section 404. In one example, the flex angle 405 may be equal or greater than the plate angle 251 or the angle 407 formed between the first and third surfaces of the engine section 404. Further, the cables 402 may be in face-sharing contact with inner surface 226 of the vertical protection shield 222 at the cable junction 403. As an example, the cables 402 may touch the inner surface 226 of the vertical protection shield 222, forming a contact interface a long a fourth plane, as shown by arrow 415.

The cables 402 may be further extended over the angled plate 208, and routed through an outlet gate 214 at a downstream end 426 of the integrated bracket 250. As an example, the cables 402 may be in face-sharing contact with an outer surface 253 of the angled plate 208 along a fifth contact plane, shown by arrow 418. When mounted inside the outlet gate 214, the cables 402 may be in face-sharing contact with an inner surface 264 of a third retaining arm 230, and outer surface 253 of the angled plate 208. For example, the cables 402 inside the outlet gate 214, may touch the inner surface 264 of the third retaining arm 230, forming contact interfaces long a first contact section, as shown by arrow 420. Similarly, the cables 402 may be retained on the outer surface 453 of the angled plate 208, thereby securing the harness to the integrated bracket 250.

As an example, the system of FIG. 4 may comprise: a vehicle body structure 404; a bracket 250 having a first plate 204 with an opening to receive a fastener to securely attach the bracket to the vehicle body structure 404; an inlet gate 212 coupled to the first plate 204; a second plate 208 coupled and angled to the first plate 204; an outlet gate 214 coupled to the second plate 208; a plurality of lines retained in a main opening 260 in the inlet gate 212, the lines extending downstream forming an angled bend 403 at a junction 237 between the first and second plate; and the lines further extending, and retained in a side opening 280 in the outlet gate 214.

In this way, the integrated bracket 250, secured to the engine section 404 via the base plate 202, may secure one or more cables 402 within the inlet and outlet gates of the bracket 250. By securing the cables 402 using retaining arms of the inlet and outlet gates, and a portion of the first plate 204, movement of the harness may be reduced to minimize stresses exerted on the cables while improving harness performance.

Figure 5:
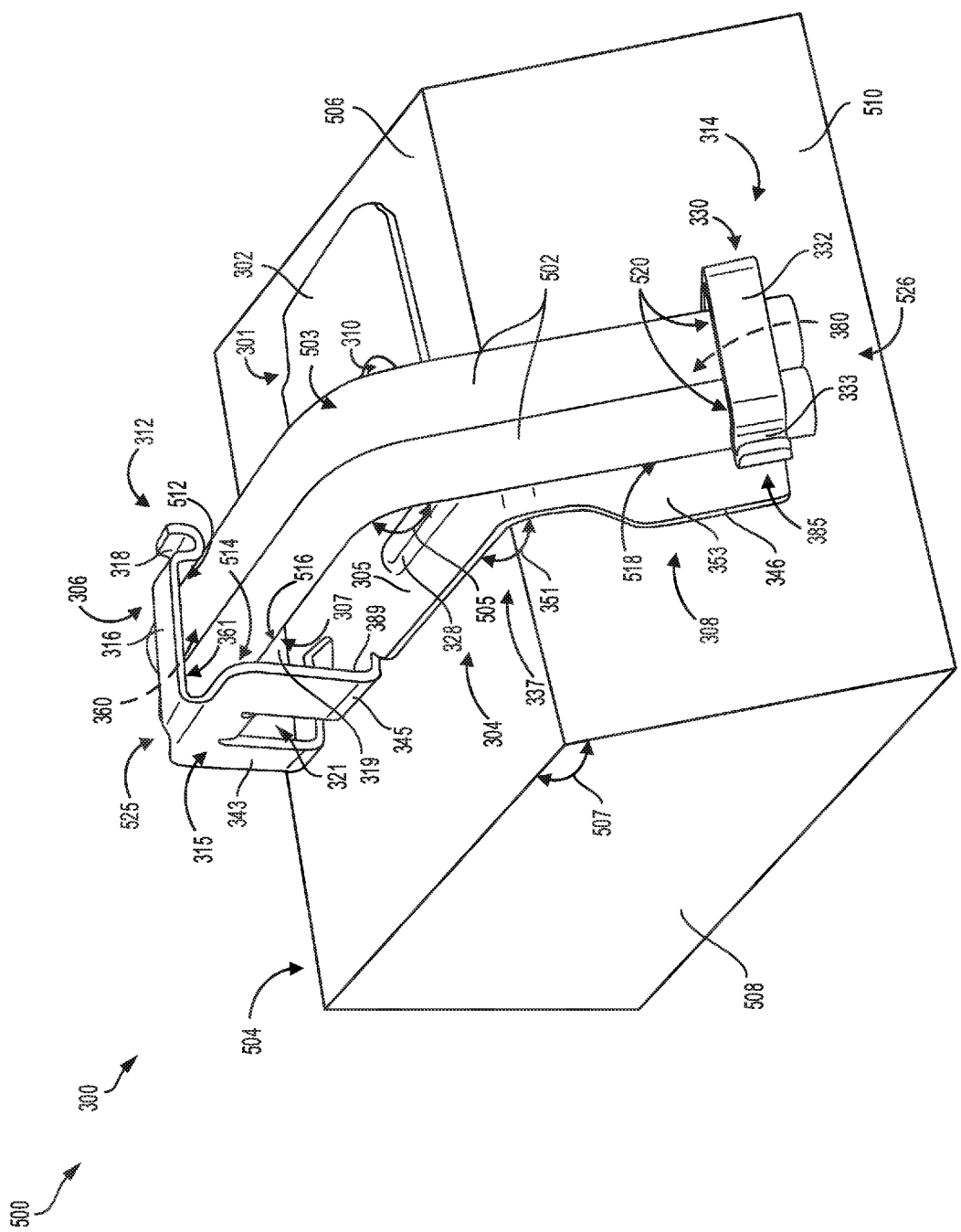
FIG. 5 shows a schematic view of the second embodiment of the bracket used to secure cables of the sensor harness to the engine.

Referring to FIG. 5, a schematic view 500 of the second embodiment of the integrated bracket 300 mounted to an engine section 504 is depicted. Specifically, one or more cables 502 comprising a harness are mounted to the integrated bracket 300 with a base plate 301 connected to a horizontal plate 304 having a flat portion 305 and an angled plate 308. The base plate 301 may be connected to a first surface 506 of the engine section 504 using a fastener inserted into an opening 310 in the base plate 301. The engine section 504 may also include a second surface 508 and a third surface 510. The first and third surfaces of the engine section 504 are joined together forming an angle 507. The first surface 506 of the engine section 504 may form a first level of a vehicle body, and the third surface 510 may form a second level of the vehicle body. In this case, the horizontal plate 304 may be mounted to the first level of the vehicle body, and the angled plate 308 may be mounted to the second level of the vehicle body.

The cables 502 may be routed through an inlet gate 312 at an upstream end 525 of the integrated bracket 300. As an example, the cables 502 mounted inside the inlet gate 312 may be in face-sharing contact with an inner surface 389 of the upstream plate 315, an inner surface 361 of a first retaining arm 306, and an outer surface 319 of a second retaining arm 307. As an example, the cables 502 may touch the inner surface 389 of the upstream plate 315, forming a first contact interface, as shown by arrow 514. In another example, the cables 502 may touch the inner surface 361 of the first retaining arm 306, and the outer surface 319 of the second retaining arm 307, forming a second and third contact interfaces, as shown by arrows 512 and 516, respectively.

The cables 502 may be extended over the flat portion 305 of the horizontal plate 304 and subsequently bent, forming a flex angle 505 at a cable junction 503. For example, a curvature of the cables 502 at the cable junction 503 may be a convex shape with a direct relationship with the flex angle 505, and a direct or indirect relationship with a plate angle 351 and the angle 507, formed between the first surface 506 and third surface 510 of the engine section 504. In one example, the flex angle 505 may be equal or greater than the plate angle 351. The cables 502 may be further extended over the angled plate 308, and routed through an outlet gate 314 at a downstream end 526 of the integrated bracket 300. For example, the cables 502 may be in face-sharing contact with an outer surface 353 of the angled plate 308 along a fourth contact interface, shown by arrow 418. When mounted inside the outlet gate 314, the cables 502 may be in face-sharing contact with an inner surface 364 of a third retaining arm 330, and an outer surface 253 of the angled plate 308. For example, the cables 502 mounted inside the outlet gate 214, may touch the inner surface 364 of the third retaining arm 330, forming a fifth contact interface, as shown by arrow 520. Similarly, the cables 502 may be held to the outer surface 553 of the angled plate 308, to securely retain the harness to the integrated bracket 300.

As an example, the system of FIG. 5 may comprise: a vehicle body structure 504; a bracket 300 having a horizontal plate 304 with an opening 310 to receive a fastener to securely attach the bracket to the vehicle body structure 504; an inlet gate 312 coupled to the horizontal plate 304; a angled plate 308 coupled and angled to the horizontal plate 304; an outlet gate 314 coupled to the angled plate 308; a plurality of lines retained in a first opening 360 in the inlet gate 312, the lines extending downstream forming an angled bend 503 at a junction 337 between the horizontal and angled plate; and the lines further extending, and retained in a second opening 385 in the outlet gate 314.

In this way, one or more cables 502 of the harness may be securely retained to the integrated bracket 300, secured to the engine section 404 via the base plate 301. By securing the cables 502 of the harness using retaining arms of the inlet and outlet gates, and a portion of the horizontal plate 304, movement of the harness may be reduced to minimize stresses exerted on the cables while improving performance of the harness.

In one example, an integrated bracket, comprises: a first plate with an opening to receive a fastener to securely attach the bracket to a vehicle body; an inlet gate coupled to the first plate; a second plate coupled and angled to the first plate; a protection shield extending from the first plate; and an exit gate attached to the second plate, each gate having an extending arm pair. In the preceding example, additionally or optionally, the protection shield comprises a flat plate extending perpendicularly from the first plate, the protection shield further comprising curved exterior ends, one of the curved ends smoothly joining a top surface of the first plate, the curved ends and flat plate forming a C-shape. In any or all of the preceding examples, additionally or optionally, the bracket may further comprise a base plate parallel to the first plate but positioned below the first plate and connected to the first plate by a transition plate. In any or all of the preceding examples, additionally or optionally, the base plate is extending on a side facing away and oppositely from the curved C-shaped ends of the protection shield. Furthermore, in any or all of the preceding examples, additionally or optionally, the inlet and exit gate each have an opening configured to enable retained cables to pass there-through, each gate further having a retaining arm forming a side opening. In any or all of the preceding examples, additionally or optionally, the first and second plates have a recess extending along a middle continuously and uninterruptedly including at a junction of the first and second plates. In any or all of the preceding examples, additionally or optionally, the entire bracket is made of a single, continuous, unitary, and monolithic metal plate structure. In any or all of the preceding examples, additionally or optionally, the bracket may further comprise an aperture in the first plate below the inlet gate, wherein there is no aperture in the second plate below the exit gate. In any or all of the preceding examples, additionally or optionally, the base plate is adjacent the vertical protection shield.

In another example, a system may comprise: a vehicle body structure; a bracket having a first plate with an opening to receive a fastener to securely attach the bracket to the vehicle body structure; an inlet gate coupled to the first plate; a second plate coupled and angled to the first plate; an outlet gate coupled to the second plate; a plurality of lines retained in a first opening in the inlet gate, the lines extending downstream forming an angled bend at a junction between the first and second plate; and the lines further extending, and retained in a second opening in the outlet gate. In any or all of the preceding examples, additionally or optionally, the first plate is mounted to a first level of the vehicle body structure, and the second plate is mounted to a second level of the vehicle body.

In other examples, additionally or optionally, an integrated bracket comprises: a horizontal plate with a slot to receive a fastener to securely attach the bracket to a vehicle body; an inlet gate coupled to the horizontal plate; an angled plate coupled and angled to the horizontal plate; and an outlet gate attached to the angled plate, each gate having extending pair of arms. In any or all of the preceding examples, additionally or optionally, the bracket comprises a base plate parallel to the horizontal plate but positioned below the horizontal plate. In any or all of the preceding examples, additionally or optionally, the inlet and outlet gate each have a first opening configured to enable retained cables to pass there-through, each gate further having a retaining arm forming a second opening. In any or all of the preceding examples, additionally or optionally, the horizontal and angled plates have a recess extending along a middle continuously and uninterruptedly including at a junction of the horizontal and angled plates. In any or all of the preceding examples, additionally or optionally, the entire bracket is made of a single, continuous, unitary, and monolithic metal plate structure. In any or all of the preceding examples, additionally or optionally, the bracket comprises an aperture in the horizontal plate below the inlet gate, wherein there is no aperture in the angled plate below the outlet gate. In any or all of the preceding examples, additionally or optionally, the bracket may have no vertical protection shield formed on the horizontal plate.

Note that the example systems included herein can be used with various vehicle configurations. It will be appreciated that the configurations disclosed herein are exemplary in nature, and that these specific embodiments are not to be considered in a limiting sense, because numerous variations are possible. For example, the above technology can be applied to various harness designs comprising one or more cables. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An integrated bracket, comprising:
a first plate with an opening to receive a fastener to securely attach the bracket to a vehicle body;
an inlet gate coupled to the first plate;
a second plate coupled and angled to the first plate;
a protection shield extending from the first plate;
an exit gate attached to the second plate, each of the inlet gate and the exit gate having an extending arm pair; and
an aperture in the first plate below the inlet gate, wherein there is no aperture in the second plate below the exit gate.

2. The bracket of claim 1, wherein the protection shield comprises a flat plate extending perpendicularly from the first plate, the protection shield further comprising curved exterior ends, one of the curved ends smoothly joining a top surface of the first plate, the curved ends and flat plate forming a C-shape.

3. The bracket of claim 2, further comprising a base plate parallel to the first plate but positioned below the first plate and connected to the first plate by a transition plate.

4. The bracket of claim 3, wherein the base plate is extending on a side facing away and oppositely from the curved C-shaped ends of the protection shield.

5. The bracket of claim 1, wherein the inlet gate and the exit gate each has an opening configured to enable retained cables to pass there-through, each gate further having a retaining arm forming a side opening.

6. The bracket of claim 1, wherein the first and second plates have a recess extending along a middle continuously and uninterruptedly including at a junction of the first and second plates.

7. The bracket of claim 6, wherein the entire bracket is made of a single, continuous, unitary, and monolithic metal plate structure.

8. The bracket of claim 4, wherein the base plate is adjacent the protection shield.

9. An integrated bracket comprising:
a horizontal plate with a slot to receive a fastener to securely attach the bracket to a vehicle body;
an inlet gate coupled to the horizontal plate;
an angled plate coupled and angled to the horizontal plate;
an exit gate attached to the angled plate, each of the inlet gate and the exit gate having extending arms;
a base plate parallel to the horizontal plate but positioned below the horizontal plate; and
an aperture in the horizontal plate below the inlet gate, wherein there is no aperture in the angled plate below the exit gate;
wherein the inlet gate and the exit gate each has a first opening configured to enable retained cables to pass there-through, the arms of each gate forming a second opening distinct from each first opening and distinct from each other;
wherein the horizontal and angled plates have a recess extending along a middle continuously and uninterruptedly including at a junction of the horizontal and angled plates; and
wherein the entire bracket is made of a single, continuous, unitary, and monolithic metal plate structure.

10. The bracket of claim 9, wherein there is no vertical protection shield formed on the horizontal plate.

* * * * *